United States Patent [19]
Takatori et al.

[11] Patent Number: 5,463,717
[45] Date of Patent: Oct. 31, 1995

[54] INDUCTIVELY COUPLED NEURAL NETWORK

[75] Inventors: Sunao Takatori; Ryohei Kumagai; Koji Matsumoto; Makoto Yamamoto, all of Tokyo, Japan

[73] Assignees: Yozan Inc., Tokyo; Sharp Corporation, Osaka, Japan

[21] Appl. No.: 549,748

[22] Filed: Jul. 9, 1990

[30] Foreign Application Priority Data

Jul. 10, 1989 [JP] Japan .................................. 1-178377
Aug. 10, 1989 [JP] Japan .................................. 1-207220

[51] Int. Cl.$^6$ .................................................. G06F 15/18
[52] U.S. Cl. ........................ 395/24; 364/777; 364/838
[58] Field of Search ............................ 395/24; 357/51; 364/846, 807, 838, 777; 326/104, 111; 327/368, 372, 365

[56] References Cited

U.S. PATENT DOCUMENTS

| | | | |
|---|---|---|---|
| 2,065,280 | 12/1936 | Koros et al. ........................ | 327/365 X |
| 2,538,500 | 1/1951 | Bess ........................ | 326/111 |
| 2,712,065 | 6/1955 | Elbourne et al. ........................ | 326/111 |
| 2,785,305 | 3/1957 | Crooks et al. ........................ | 326/111 X |
| 2,798,156 | 7/1957 | Selmer ........................ | 326/111 X |
| 2,808,990 | 10/1957 | Allen ........................ | 364/846 X |
| 2,820,897 | 1/1958 | Dean et al. ........................ | 326/111 |
| 2,824,697 | 2/1958 | Pittman et al. ........................ | 364/838 X |
| 2,901,605 | 8/1959 | Raymond et al. ........................ | 326/111 X |
| 2,934,271 | 4/1960 | Kessel ........................ | 326/111 X |
| 2,934,706 | 4/1960 | Johnson et al. ........................ | 326/111 X |
| 2,941,722 | 6/1960 | Van Allen ........................ | 364/846 |
| 2,943,791 | 7/1960 | Henle et al. ........................ | 364/777 |
| 2,981,473 | 4/1961 | Goto ........................ | 364/846 |
| 3,021,440 | 2/1962 | Anderson ........................ | 327/368 |
| 3,247,366 | 4/1966 | Tiemann ........................ | 364/838 X |
| 3,250,918 | 5/1966 | McGrogan ........................ | 395/24 |
| 3,302,038 | 1/1967 | Wine ........................ | 327/372 |
| 3,351,773 | 11/1967 | Wolf et al. ........................ | 395/24 |
| 3,353,105 | 11/1967 | Allmark et al. ........................ | 326/104 |
| 3,383,500 | 5/1968 | Ernst ........................ | 364/846 X |
| 3,571,918 | 3/1971 | Haberecht ........................ | 29/577 |
| 3,691,400 | 9/1972 | Askew ........................ | 395/24 |
| 3,765,082 | 10/1973 | Zyetz ........................ | 29/602 |
| 4,297,647 | 10/1981 | Akiyama et al. ........................ | 330/307 |
| 4,322,698 | 3/1982 | Takahashi et al. ........................ | 333/184 |
| 4,543,553 | 9/1985 | Mandai et al. ........................ | 336/83 |
| 4,565,931 | 1/1986 | Fumey ........................ | 307/262 |
| 4,660,166 | 4/1987 | Hopfield ........................ | 395/24 |
| 4,719,591 | 1/1988 | Hopfield ........................ | 395/24 |
| 4,731,747 | 3/1988 | Denker ........................ | 395/24 |
| 4,771,247 | 9/1988 | Jacomb-Hood ........................ | 330/277 |
| 5,058,184 | 10/1991 | Fukushima ........................ | 395/24 |
| 5,371,835 | 12/1994 | Akamatsu et al. ........................ | 395/24 |

FOREIGN PATENT DOCUMENTS

| | | | |
|---|---|---|---|
| 1158507 | 6/1958 | France ........................ | 364/777 |
| 896413 | 5/1962 | United Kingdom ........................ | 364/777 |

OTHER PUBLICATIONS

A Magnetic Power and Communication Interface for a CMOS Integrated Circuit; Glasser et al.; IEEE J. of Solid–State Circuits; vol. 24, No. 4; Aug. 1989; pp. 1146–1149.

A Magnetic Power and Communication Interface for a CMOS Die; Melany et al.; IEEE Inter. Solid–State Circuits Conf.; pp. 264, 265, 398, 399; 1988.

An Introduction to Computing With Neural Nets; Lippmann; IEEE ASSP Magazine; Apr. 1987; pp. 4–22.

Primary Examiner—Allen R. MacDonald
Attorney, Agent, or Firm—Cushman, Darby & Cushman

[57] ABSTRACT

A data processing system based on the concept of a neural network includes a normalizing circuit and driving elements. Each driving element has an output inductor magnetically coupled to an input inductor of the normalizing circuit. In the normalizing circuit, the input inductor is coupled to receive an input signal. The circuit also has a switching circuit responsive to the input signal and a switched inductor energized in response to the switched signal. The switched inductor comprising either a hooked or a spiral inductor.

5 Claims, 10 Drawing Sheets

INDUCTIVELY COUPLED NEURAL NETWORK

FIELD OF THE INVENTION

The present invention relates to a data processing system based on a concept of a neural network.

A neural network for such a data processing system is organized by arranging neuron models 1 (hereafter called "neurons"), shown in FIG. 11, in parallel as shown in FIG. 12.

Data signal DO is output according to the comparison result between the sum of multiplied input data and a threshold θ. Input data DI1, DI2, DI3 ... DIN, are multiplied by weights W1, W2, W3, ... Wn, respectively. Various comparison manners are possible. For example, it may be that:

an output data signal DO becomes "1" when the sum of weighted inputs is more than or equal to a threshold θ, and an output data signal Do becomes "0" when the sum is smaller than the threshold θ.

A neural network is constructed by connecting neural layers in series, while a neural layer is constructed by arranging neurons in parallel. Conventionally, there has not been an established theory for the construction of a neural network. Employing a perceptron proposed by Rosenblatt, a neural network usually is constructed with three layers consisting of as many neurons as the number of input data. Therefore, the data processing function to be performed by a neural network and the structure of the neural network has never been clarified. A network could not be evaluated in advance to determine with certainty whether the network would accomplish its expected function.

As for a neuron, which is the component of the neural network, the so-called Macalloch-Pitts model can be implemented with a digital circuit. The Macalloch-Pitts model handles normalized digital signal as an output, as expressed by the following formula:

$$[\phi(\Sigma w \, i \, A \, i) - \theta]$$

where,

φ: normalizing function, wi: weight of i-th synapse,

Ai: input to i-th synapse,

θ: threshold for neuron.

Rather large circuits are necessary for calculations with multiplications. It is difficult to construct a large-scale neural network due to circuitry limits of integrated circuits. Neural networks constructed from analog circuit are referenced in U.S. Pat. Nos. 4,660,166, 4,719,591 and No. 4,731,747. The neural network disclosed in these patents has variable resistance inputs to operation amplifiers, each of which is connected to all other amplifiers in order to evaluate the following energy formula:

$$E = (1/2) \Sigma_i \Sigma_j TijViVj + \Sigma(Ii/Ri) \int_0^{Vi} g_i^{-1}(V)dV - \Sigma_i IiVi$$

The neural network suggested here is effective to calculate the minimum and maximum in variables given by the functional equivalent to the formula above. It is used, for example, to solve the problem of the travelling salesman.

Such a neural network lacks the ability to output a digital value with normalization, that is, according to a compression with threshold. It cannot realize the information compression, integration or approximation functions of a neural network of an organism. Therefore, the most advantageous characteristics of a neural network cannot be obtained by the above construction; that is, the improvement and associative convention of an input pattern cannot be performed.

SUMMARY OF THE INVENTION

The present invention solves the above problems of the prior art and has an object to provide a data processing system capable of executing objective data processing with certainty.

The present invention has an object to provide a data processing system as an integrated circuit with a normalizing function.

A data processing system according to the present invention is characterized in that:

the number of neural layers is equal to the abstraction difference between output data and input data; and at least two neural layers are divided into a plurality of neural cells which include at least one neuron, and neurons included in each neural cell are not connected to neurons of other neural cells.

A data processing system according to the present invention includes a resonance input system which is connected to a switching circuit and is driven by a plurality of output resonance systems, It realizes the function of normalization by the breaking performance of a switching circuit,

PREFERRED EMBODIMENT OF THE PRESENT INVENTION

Hereinafter, an embodiment of the data processing system according to the present invention is described with reference to the attached drawings.

Figure 1:
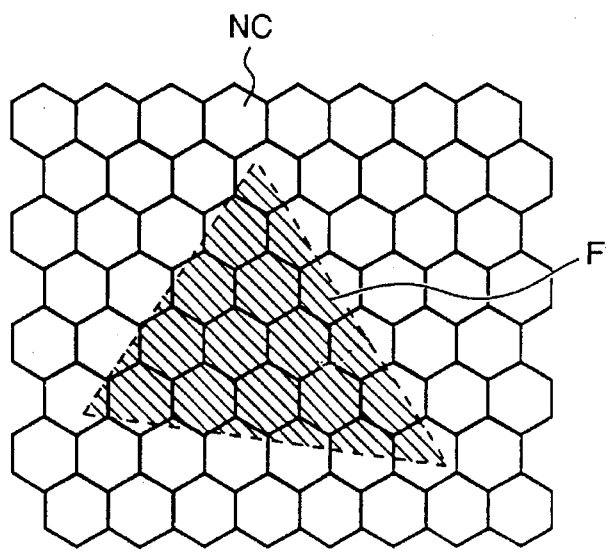
FIG. 1 shows a schematic diagram of an embodiment of a data processing system including neural cells, according to the present invention.

As shown in FIG. 1, the data processing system consists of a plurality of neural cells NC each of which is formed into a hexagon so that a honeycomb structure is constructed as a whole.

In general, an image is processed after it is divided into a plurality of unit areas. A unit area may be a square or a rectangular area, such as a 3×3 pixel area. Such unit areas result from hardware that scans an image along horizontal scan lines. The preferred form of a unit area is the one whose boundaries touch under equivalent conditions to adjacent unit areas. The honeycomb structure will provide the best processing by means of this condition. It is possible to employ such a unit area because the structure of a neural layer can be set up independently from hardware for scanning an image. Accordingly, it is possible to optimize processing by setting up a unit area at the neural network, rather than at the input to the system.

Binary data is input to the data processing system through an input system (not shown). By way of example, FIG. 1 shows a triangle F input to the data processing system.

Figure 2:
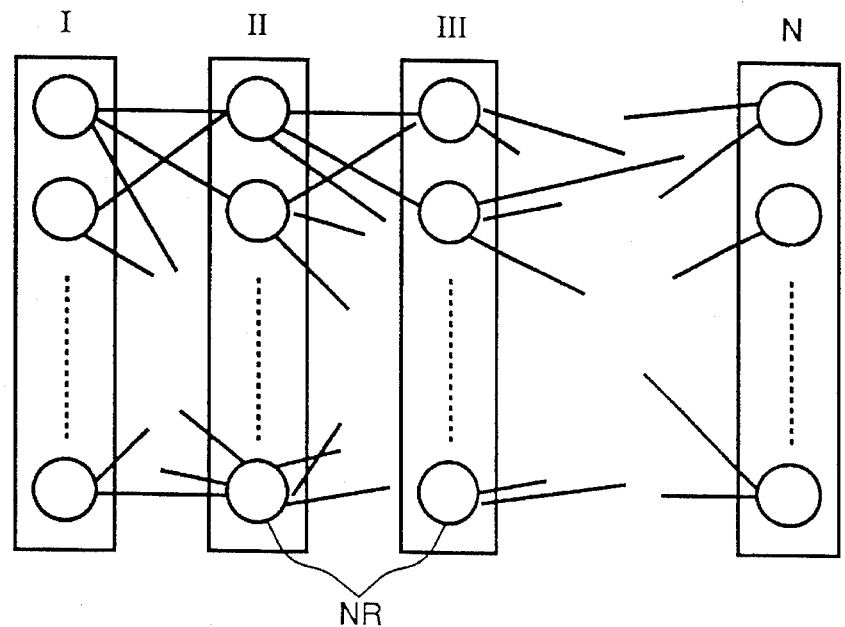
FIG. 2 shows a schematic diagram including layers of a neural cell of FIG. 1.

Each neural cell comprises a plurality of neural layers and each neural layer is constructed by arranging a plurality of neurons N in parallel. A structure of a neural cell is shown in FIG. 2. According to the above embodiment, a neuron NR of each neural layer is connected with all neurons of an adjacent neural layer. Input data is processed by neural layers, successively, so as to obtain the final output, wherein the output of the nth neural layer is the input of n+1st neural layer.

Figure 3:
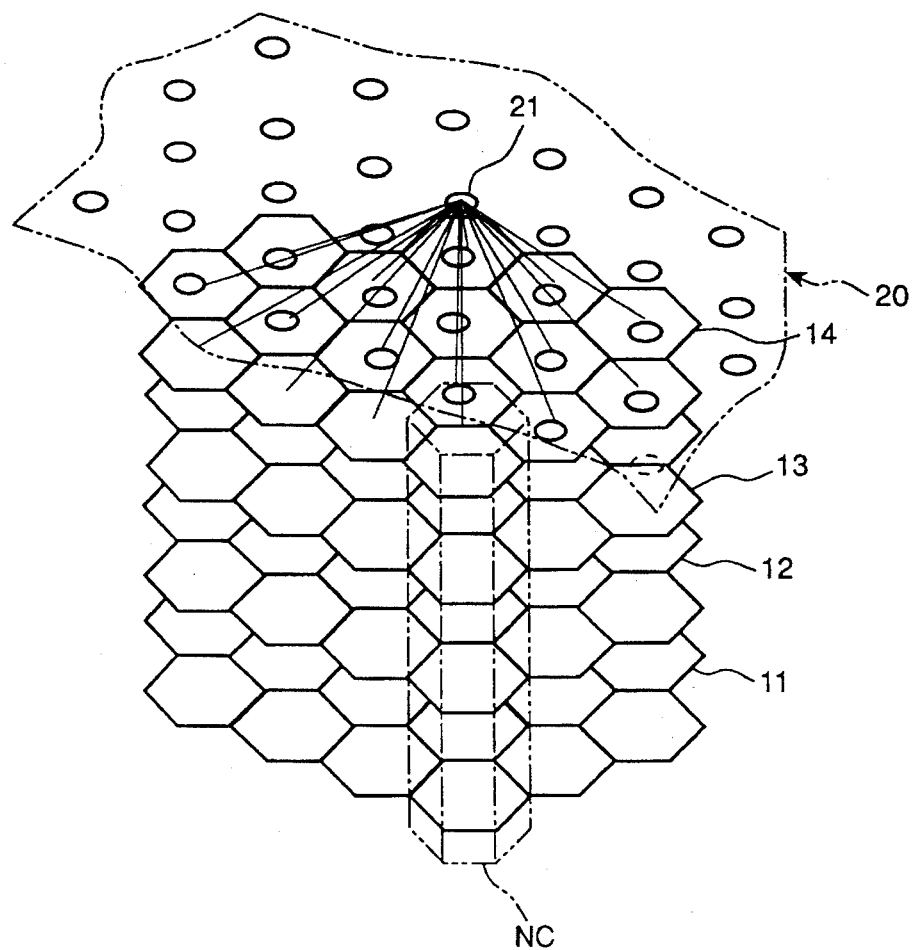
FIG. 3 shows a schematic diagram indicating the structure of a neural cell and the structure of a neural layer.

FIG. 3 schematically shows neural cells of neural layers 11, 12, 13 and 14 and typical relationships between a neural cell and the following neural layer 20. In FIG. 3 each of neural layers 11, 12, 13 and 14 is divided into hexagonal neural cells NC. That is, a neural cell includes a plurality of neural layers 11, 12, 13 and 14 and a large number of neurons are included in each neural layer. Neurons are connected with one another only within a neural cell, and neurons belonging to different neural cells are never connected with each other. Accordingly, data transmission is only performed within each neural cell. It is also possible to construct a neural cell. Preparing a neural cell NC with 2 neural layers is acceptable.

A data processing system is able to furnish the desired processing function by learning. By way of example, performance of a simple recognition of a geometric figure will be described.

Figure 4:
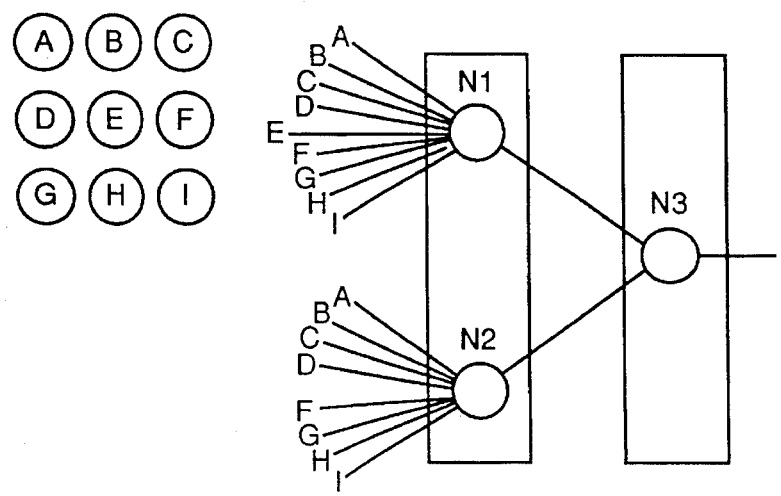
FIG. 4 shows a schematic diagram indicating an edge extraction processing system according to a neural cell of FIG. 3.

An embodiment of a neural layer for the performance of edge extraction is shown in FIG. 4. Neurons A to I correspond to a 3×3 convolution in which a neuron outputs "1" with respect to an input with a high brightness value. Existence of edges, except for isolated points, can be described by a logical formula as follows:

$$E\ (\overline{A}+\overline{B}+\overline{C}+\overline{D}+\overline{F}+\overline{G}+\overline{H}+\overline{I})\ (A+B+C+D+F+G+H+I)=1 \quad (1)$$

Outputs A to I are input to neuron N1, and outputs A to D, and F to I are input to neuron N2. Then, outputs from neuron N1 and N2 are input to neuron N3. Here, weights for neurons N1 to N3 and thresholds are set up as shown in Tables I to 3.

TABLE 1

Weight and threshold for neuron N1

| | | |
|---|---|---|
| Weight with respect to output A | W1A | −1 |
| Weight with respect to output B | W1B | −1 |
| Weight with respect to output C | W1C | −1 |
| Weight with respect to output D | W1D | −1 |
| Weight with respect to output E | W1E | 9 |
| Weight with respect to output F | W1F | −1 |
| Weight with respect to output G | W1G | −1 |
| Weight with respect to output H | W1H | −1 |
| Weight with respect to output I | W1I | −1 |
| Theshold | θ1 | 0.5 |

TABLE 2

Weight and threshold for neuron N2

| | | |
|---|---|---|
| Weight with respect to output A | W2A | 1 |
| Weight with respect to output B | W2B | 1 |
| Weitht with respect to output C | W2C | 1 |
| Weight with respect to output D | W2D | 1 |
| Weight with respect to output E | W2E | 1 |
| Weight with respect to output F | W2F | 1 |
| Weight with respect to output G | W2G | 1 |
| Weight with respect to output H | W2H | 1 |
| Weight with respect to output I | W2I | 1 |
| Theshold | θ2 | 0.5 |

TABLE 3

Weight and threshold for neuron N3

| | | |
|---|---|---|
| Weight with respect ot output N1 | W3N1 | 1 |
| Weight with respect to output N2 | W2N2 | 1 |
| Threshold | θ | 1.5 |

Here, neuron N1 performs the function:

$$E(\overline{A}+\overline{B}+\overline{C}+\overline{D}+\overline{F}+\overline{G}+\overline{H}+\overline{I}) \quad (2)$$

Neuron N2 performs the function:

$$A+B+C+D+F+G+H+I \quad (3)$$

On the other hand, neuron N3 performs the AND function on the results of formulas (2) and (3). Therefore, neuron N3 outputs "1" when the edge of a configuration is projected onto neuron E.

Hereinafter, a neural network which performs corner extraction is described with reference to FIG. 5. Inputs of this neural network are outputs of neurons such as neuron N3 of FIG. 4. The logic formula (4) for extracting the corner is shown as follows:

$$E' (A' B' + A' C' + A' D' + A' F' + \quad (4)$$
$$A' G' + A' H' + B' C' + B' D' +$$
$$B' F' + B' G' + B' I' + C' D' +$$
$$C' F' + C' H' + C' I' + D' G' +$$
$$D' H' + D' I' + F' G' + F' H' + F' I' +$$
$$G' H' + G' I' + H' I') = 1$$

In formula (4) values A' to I' are output signals from neurons such as N3 in FIG. 4. Outputs A' to D' and F' to I' are input to neurons N401 to N424 as shown in FIG. 5. Neurons N401 to N424 are prepared with weights and threshold values as shown in Table 4.

TABLE 4

| Neuron | Weight | Input | Threshold |
|---|---|---|---|
| N401 | A', B' | 1 | 1.5 |
| N402 | A', C' | 1 | 1.5 |
| N403 | A', D' | 1 | 1.5 |
| N404 | A', F' | 1 | 1.5 |
| N405 | A', G' | 1 | 1.5 |
| N406 | A', H' | 1 | 1.5 |
| N407 | B', C' | 1 | 1.5 |
| N408 | B', D' | 1 | 1.5 |
| N409 | B', F' | 1 | 1.5 |
| N410 | B', G' | 1 | 1.5 |
| N411 | B', I' | 1 | 1.5 |
| N412 | C', D' | 1 | 1.5 |
| N413 | C', F' | 1 | 1.5 |
| N414 | C', H' | 1 | 1.5 |
| N415 | C', I' | 1 | 1.5 |
| N416 | D', G' | 1 | 1.5 |
| N417 | D', H' | 1 | 1.5 |
| N418 | D', I' | 1 | 1.5 |
| N419 | F, G' | 1 | 1.5 |
| N420 | F, H' | 1 | ·1.5 |
| N421 | F, I' | 1 | 1.5 |
| N422 | G', H' | 1 | 1.5 |
| N423 | G', I' | 1 | 1.5 |
| N424 | H', I' | 1 | 1.5 |

Outputs of neurons N401 to N424 are input to neuron N425, which has weights and a threshold as shown in Table 5.

TABLE 5

| Neuron | Weight | Threshold |
|---|---|---|
| N401~ N424 | 1 | 1.5 |

This is equivalent to OR logic.

Furthermore, the output signal of neuron N425 and the signal E' are input to neuron N426 which has weights and a threshold as shown in Table 6.

TABLE 6

| Neuron | Weight | Threshold |
|---|---|---|
| N245 | 1 | 21.5 |
| E | 1 | |

This is equivalent to AND logic.

Figure 6:
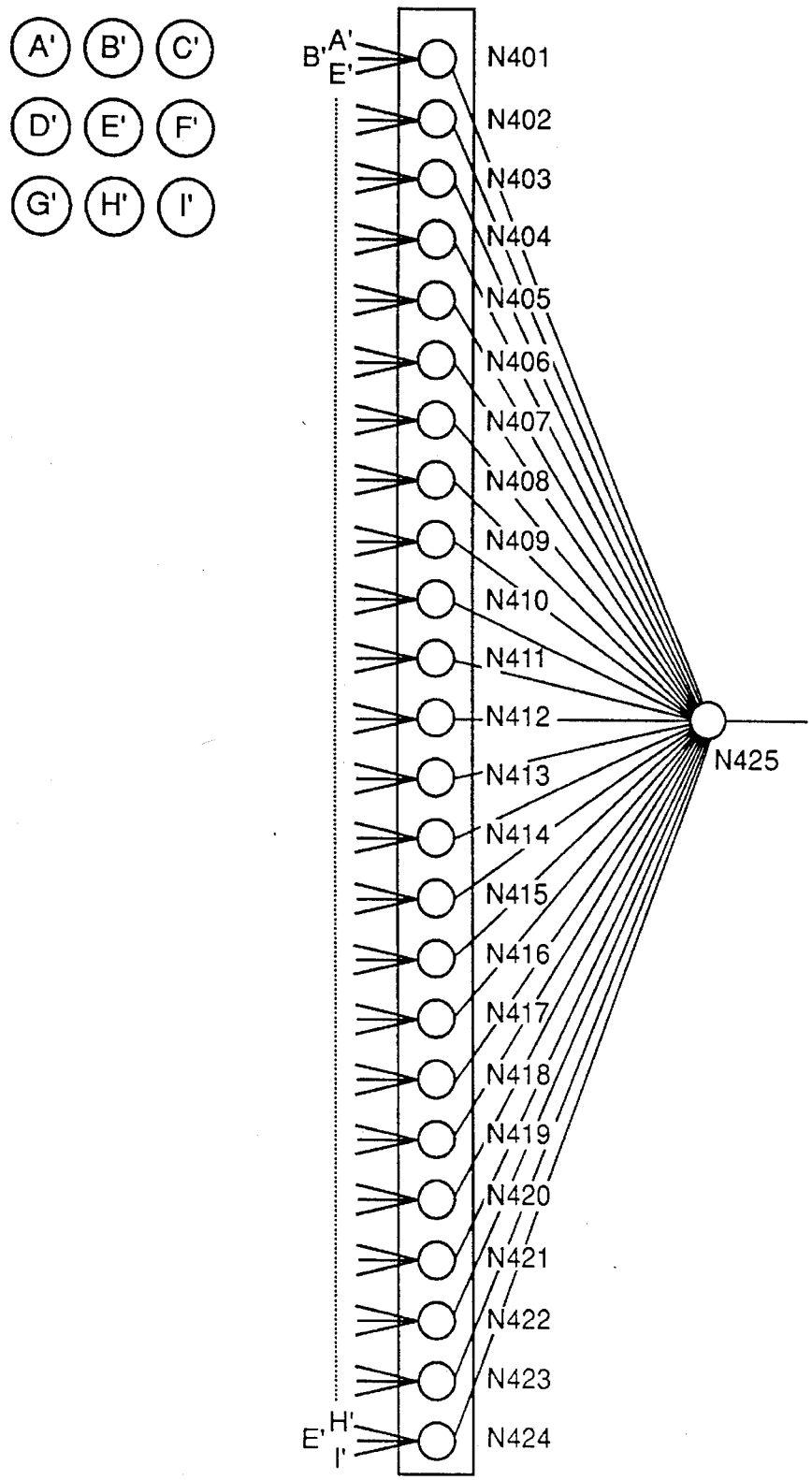
FIG. 6 shows a schematic diagram indicating an example of a transformation of the system of FIG. 4.

Although weights evolve automatically with learning and optimized association can be obtained by appropriate learning, a high neuron efficiency can be obtained by an advanced artificial setup of a layer to which data is input. For example, a neural network with the same functions as FIG. 4 can be constructed by inputting data E' to the first neural layer together with A' to D' and F' to I' as shown in FIG. 6. In this case, it is possible to reduce the number of layers by 1; however, the number of connection lines increases, as does the number of synapses of the first neural layer. Since input E' according to the formula (4) is combined with the result of the logic operation (A', B'+. . . ), input E' is considered to have the same abstraction ratio as the result inside the parenthesis. Therefore, neuron efficiency can be improved by inputting E' into the layer corresponding to this abstraction ratio.

Here, the concept of degree according to abstraction ratio of data is implemented using the following definitions:

1. By a processing of a single neural layer, degree is heightened by 1.

2. Inputs to the same neural layer have the same degree.

Figure 5:
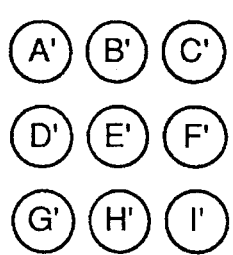
FIG. 5 shows a schematic diagram indicating a corner extraction processing system according to a neural cell of FIG.
Figure 5:
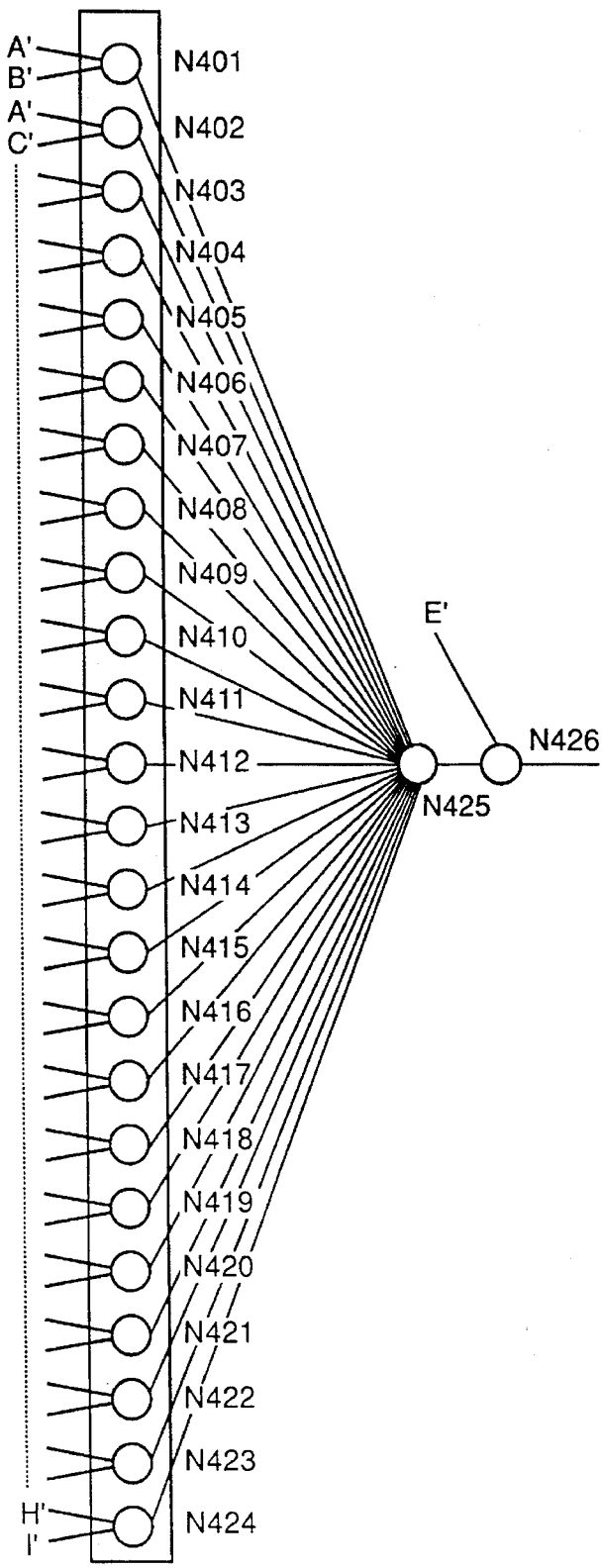

According to the above definitions, four layers (in the case when the constructions in FIG. 4 and FIG. 6 are connected) or five layers (in the case when the constructions in FIG. 4 and FIG. 5 are connected) are necessary for corner extraction. The degree of the final output becomes 4 or 5 degrees when degree of image data (the input to neurons A to I) is deemed to be 0.

Figure 7:
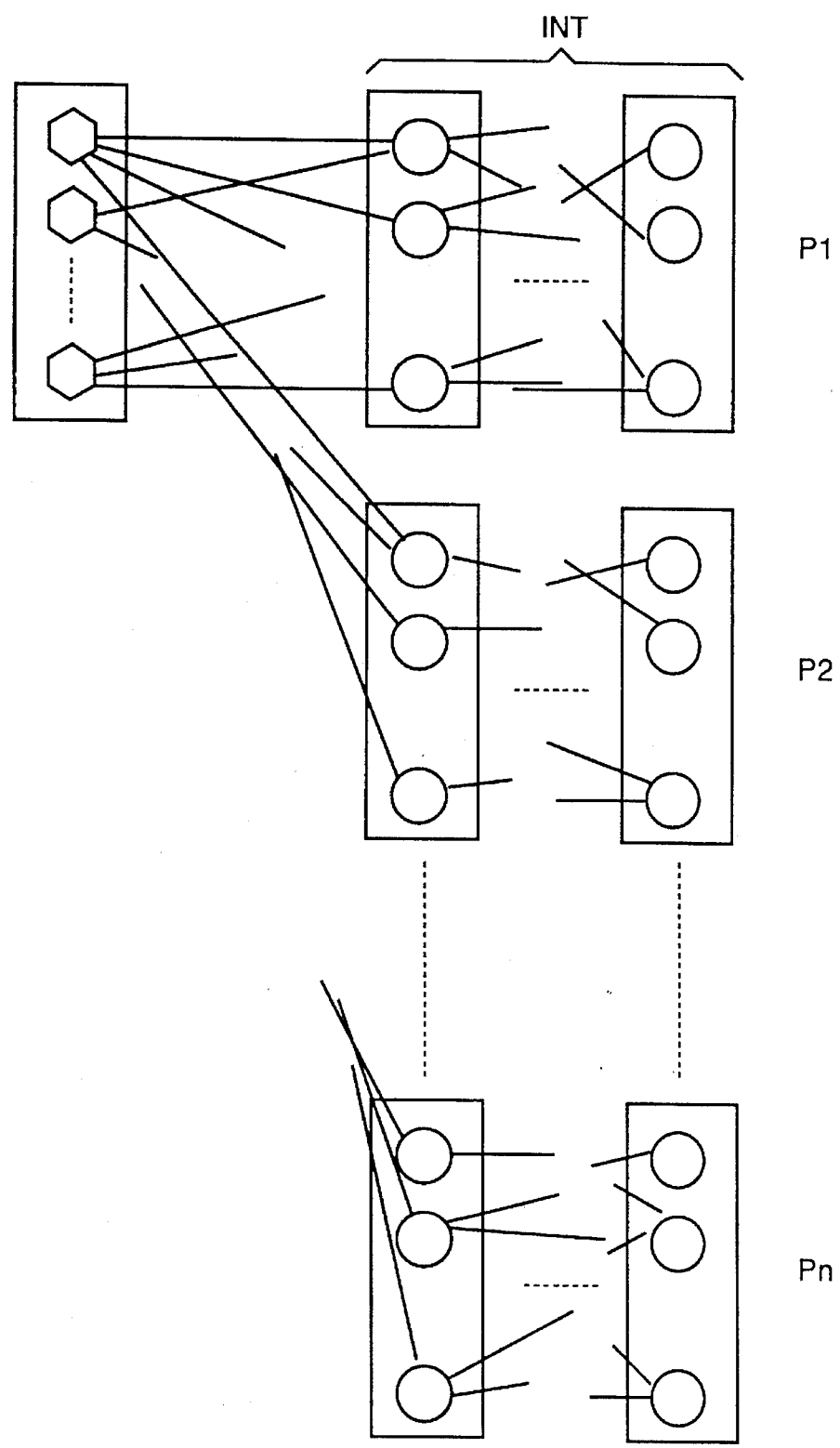
FIG. 7 shows a schematic diagram indicating a synthetic processing system at following a column of a neural processing system.

Each cell generates an output signal indicating whether the cell has identified (extracted) a corner or edge. As shown in FIG. 7, this output signal from neural cells are input to neural layer group INT for the unification. Data to be processed at neural layer group INT is data at a higher abstraction degree than at the previous neural layer. Neural layer group INT is composed of multiple processing systems P1 to Pn, and each processing system is constructed with multiple neural layers. Processing systems P1 to Pn are classified by the shape of a configuration for which they are adapted. e.g., triangle, rectangle or a polygon with (n+2) corners.

Outputs from neural cells are signals showing the existence of edges (hereinafter called "ES") and corners (hereinafter called "CS") inside the neural cells.

Figure 8:
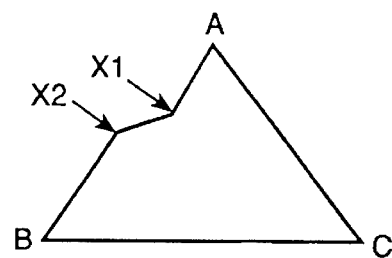
FIG. 8 shows a schematic diagram indicating a pseudo-corner of a configuration.

There is the case in which a pseudo-corner X1 or X2 appears in a side of a configuration, as shown in the triangular configuration of FIG. 8, due to noise or tolerance of the configuration itself. According to the processing system for a triangle, such false corner signal is removed, and actual corners A, B and C are enhanced so as to output the coordinate values. An embodiment of a neural network which performs the enhancement of corner A, B and C and the removal of the pseudo-corner is shown in FIG. 9.

Figure 9:
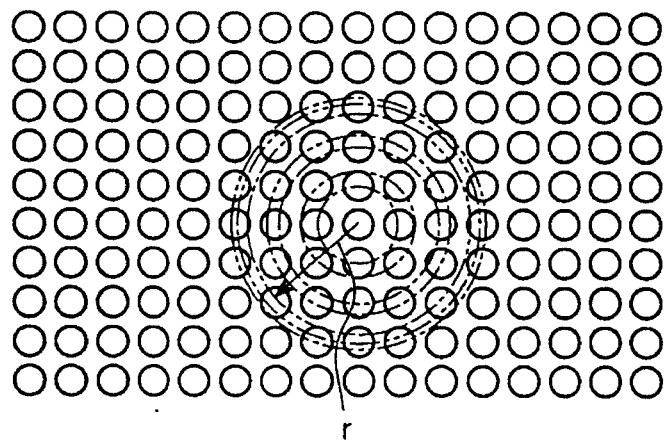
FIG. 9. shows a schematic diagram indicating the relationship between neurons by location.
Figure 10:
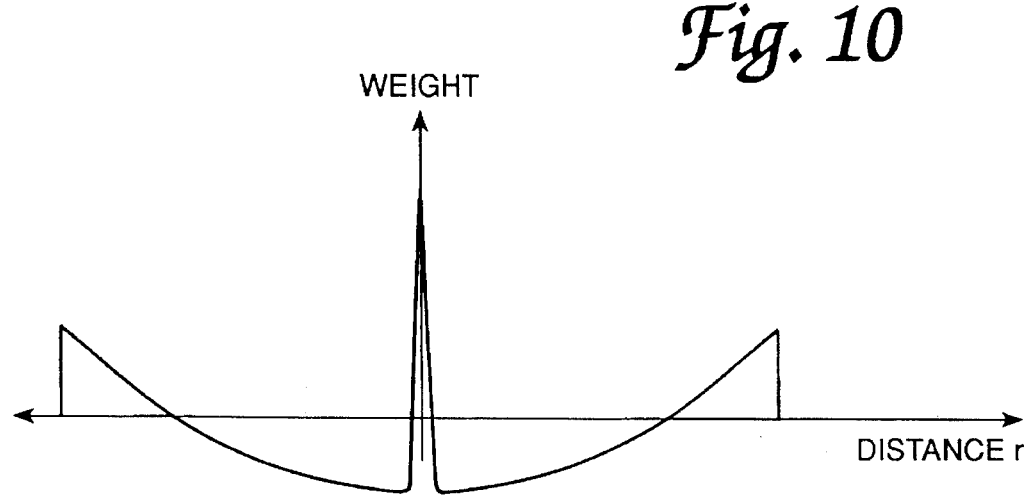
FIG. 10 shows a graph indicating the weight relationship between neurons by distance.
Figure 11:
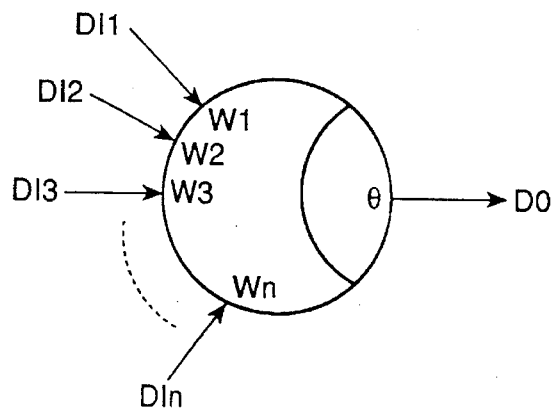
FIG. 11 shows a schematic diagram indicating a neuron model.
Figure 12:
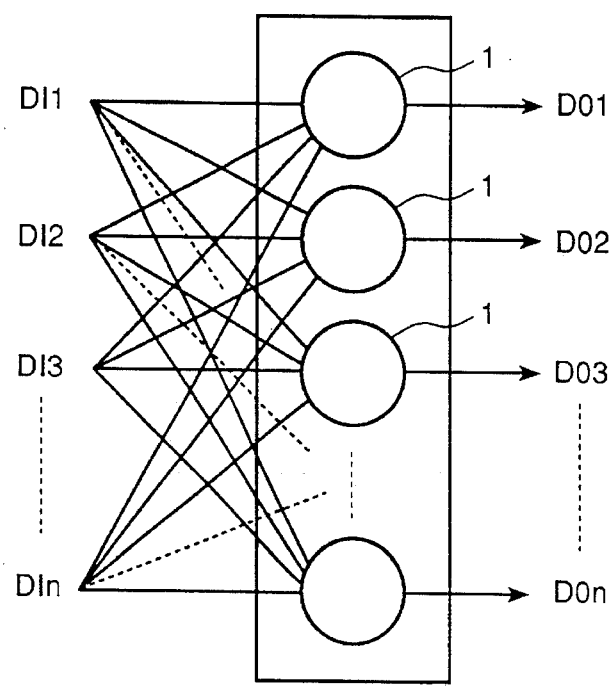
FIG. 12 shows a schematic diagram indicating an example of a neural layer.

Neurons corresponding to said neural cells are included in the neural network in FIG. 9. Each neuron is connected to all neural cells NC as neuron 21 in FIG. 3. Weight given each neuron is:

the maximum as compared with the input of a corresponding neural cell CS;

the negative weight whose absolute value is the largest as compared with surrounding neural cells;

increased as the distance from the corresponding neural cell becomes larger. The above relationship is depicted in FIG. 10. A corner signal of a pseudo-corner is weakened, and signals of corners A, B and C are enhanced. The graph in FIG. 10 shows the approximation curve of a second degree indicating the relationship between distance and weight. Needless to say, adaptation of a monotonically increasing curve is also possible.

A structure for the performance of edge enhancement of a perceptron ignition pattern is proposed by Rosenblatt, by giving a control-type connection from a reaction layer to an integration layer (feedback). However, there is no suggestion whatsoever to feed forward a control-type connection for corner enhancement of a specific configuration.

Data to be input to neural layer INT (such as corner or edge data) can be said to have been abstracted by a neural cell to a relatively high degree. It is possible to input data to neural layer group INT directly from an image processing system capable of extracting corner and edge data. It is possible to heighten the neuron efficiency (reduce the number of neurons or numbers of connections) by inputting high degree data, corners for example, to the neural layer at following column, when image data and characteristics data are confused. It is possible to calculate the minimum number of neural layers needed to achieve an expected objective result by calculating the difference between the abstraction degree of the data to be output and the degree of the data to be input.

Therefore, the present invention has the following advantages:

(1) a predetermined process is certainly performed when the number of neural layer increases with the abstraction of the output; and (2) each neural cell is divided, and data to be input to a neural cell is output after it is processed within the cell.

A predetermined process is certainly performed due to the fact that input data is processed after being classified with respect to the sorts or the character.

Figure 13:
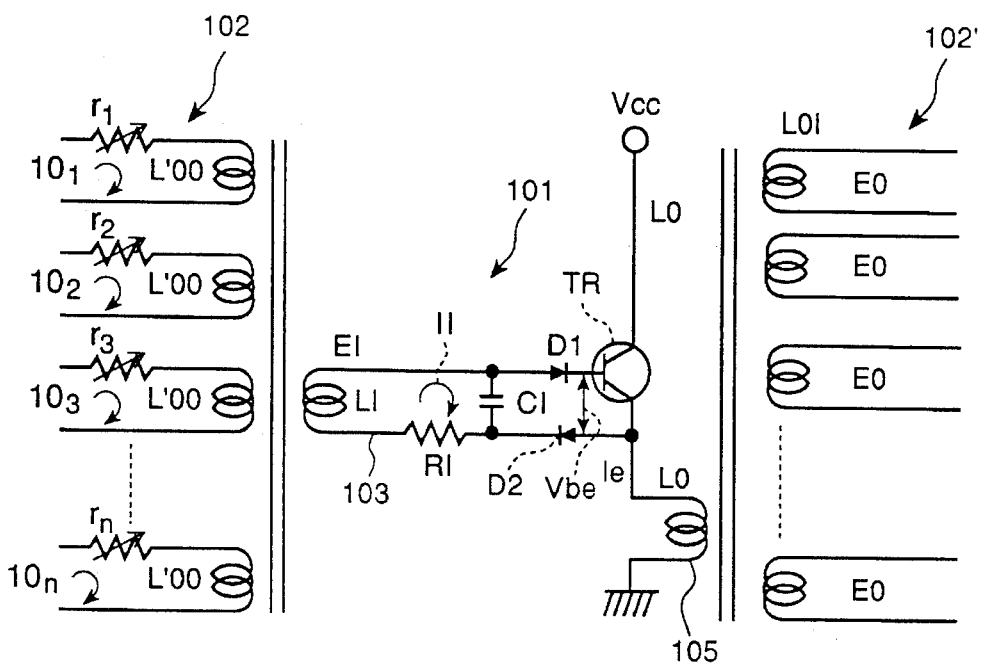
FIG. 13 shows a circuit with the structure of a basic unit in a first embodiment of a data processing system according to the present invention.

Hereinafter, an embodiment of the data processing system according to the present invention is described with reference to the attached drawings. The data processing system has the basic circuit shown in FIG. 13. The circuit in FIG. 13 comprises normalizing circuit 101, closed circuits for output and input 102 and 102'. Normalizing circuit 101 is a resonance system, comprising a closed circuit 103 for input, inductance L1 for input, capacitance CI for output and resistance RI.

Electromotive force EI is induced in closed circuit 103 by circuit 102. Capacitance CI is charged by an induced current II generated by the induced electromotive force EI in closed circuit 103; consequently, a potential difference is generated across CI.

A switching circuit 101 includes a transistor TR whose base and emitter are connected to opposite terminals of capacitance CI, respectively. When a forward voltage Vbe between the base and emitter of the transistor TR exceeds the breaking range of TR, TR becomes conductive. A collector voltage Vcc is loaded on the collector of TR, and the emitter of transistor TR is connected to ground through an inductance LO for output. Closed circuit 103 and transistor TR are connected with each other through diodes D1 and D2 which have the function of commutation in the forward direction so as to prevent the transistor TR from being reverse biased. When transistor TR is conductive, emitter current Ie flows through inductance 105.

Inductance 105 is connected magnetically with a plurality of closed circuit 102' for output. Induced electromotive forces EO are generated in each closed circuit 102' by inductance 105.

Figure 14:
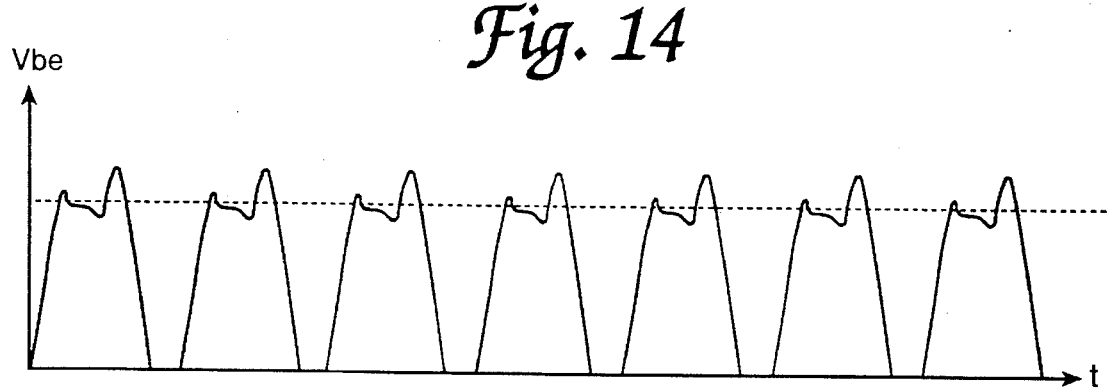
FIG. 14 is a diagram showing voltages between a base and an emitter of a transistor in the first embodiment.

As shown in FIG. 14, closed circuits 102 and 102' comprise inductance LOI for input, inductance L'OO for output and variable resistance r. The induced electromotive force EO is generated by mutual inductance between inductance LOI of circuit 102' and inductance LO of normalizing circuit 101. Output current IO is generated by the induced electromotive force EO in closed circuit 102'. Simultaneously, the induced electromotive force EI is generated in closed circuit 101 by mutual inducing action between inductance LOO and inductance LI for input. Potential difference Vci generated in capacitance CI by induced electromotive force EI is as follows.

$$Vci = \frac{1}{CI} \int II \, dt \quad (1)$$

The electromotive force generated in each closed circuit 102 for output is assumed to be Vi (i is from I to n), and Vi is as in formula (2).

$$Vi = Voi \sin(\omega t + Si) \quad (2)$$

where, $\omega$ is the resonance angle frequency common to all closed circuits 102 and 102' and closed circuit 103 for inputting. That is, all closed circuits have the common resonance frequency. The attenuation is minimized during the transmission of electrical signal from closed circuit 103 to normalizing circuit 101 and during the transmission of electrical signal form normalizing circuit 101 to closed circuit 102' because of the common resonance frequency. Assuming the resistance value of variable resistance r in i-th closed circuit 102 to be ri, the current IOi generated in the closed circuit 102 can be calculated from formula (2), then the formulae below can be obtained:

$$\begin{aligned} V_i &= (LOI + LOO)\frac{dIO_i}{dt} + \\ &\quad r_i IO_i(LOI + LOO)\frac{dIO_i}{dt} + r_i OI_i \\ &= V_{oi}\sin(\omega t + Si) \end{aligned} \quad (3)$$

$$IO_i = \{V_{oi}/\sqrt{r_i^2 + \omega^2(LOI + LOO)^2}\}\sin(\omega t - \theta i) \quad (4)$$

$$\theta i = -\tan^{-1}\{\omega(LOI + LOO)/ri\} \quad (5)$$

Induced electromotive force EI in closed circuit 103 is expressed in formula (6), assuming that the mutual inductance is M between inductance L'OO in closed circuit 102 and inductance LI in closed circuit 103 and summing that $\Gamma$ equals Co $\epsilon$o $\mu$o (Co is light speed in vacuum, $\epsilon$o is dielectric constant in vacuum of rational units, $\mu$o is magnetic permeability in vacuum of rational units).

$$EI = -\frac{M}{\Gamma^2} \sum_i \frac{dIO_i}{dt} \quad (6)$$

$$= -\frac{\omega M}{\Gamma^2} \sum_i \frac{VO_i \cos(\omega t - \theta i)}{r_i^2 + \omega^2(LOI + LOO)^2} \quad (7)$$

Therefore, the current shown below is generated in closed circuit 103.

$$LI\frac{dII}{dt} + RI \cdot II + \frac{1}{CI} \int II \, dt = \quad (8)$$

$$-\frac{\omega M}{\Gamma^2} \sum_i \frac{VO_i \cos(\omega t - \theta i)}{r_i^2 + \omega^2(LOI + LOO)^2}$$

$$II = \frac{\omega^2 M}{\Gamma^2 RI^2 + \left(\omega LI + \frac{1}{\omega CI}\right)^2} \times \quad (9)$$

$$\sum_i \frac{VO_i \cos(\omega t - \theta i)}{r_i^2 + \omega^2(LOI + LOO)^2}$$

Substituting (9) into (1), formula (10) is obtained.

$$VC_i = -\frac{\omega M}{\Gamma^2 CI \sqrt{RI^2 + \left(\omega LI + \frac{1}{\omega CI}\right)^2}} \times \sum_i \frac{VO_i \cos(\omega t - \theta i)}{\sqrt{r_i^2 + \omega^2(LOI + LOO)^2}} \quad (10)$$

Accordingly, Vbe is expressed as in formula (11).

$$Vbe = |Vci| \quad (11)$$
$$= \frac{\omega M}{\Gamma^2 CIZI} \sum_i \frac{VO|\cos(\omega t - \theta i)|}{ZO_i}$$
$$ZI = \sqrt{RI^2 + \left(\omega LI + \frac{1}{\omega CI}\right)^2}$$
$$ZO_i = \sqrt{ri^2 + \omega^2(LOI + LOO)^2}$$

Figure 15:
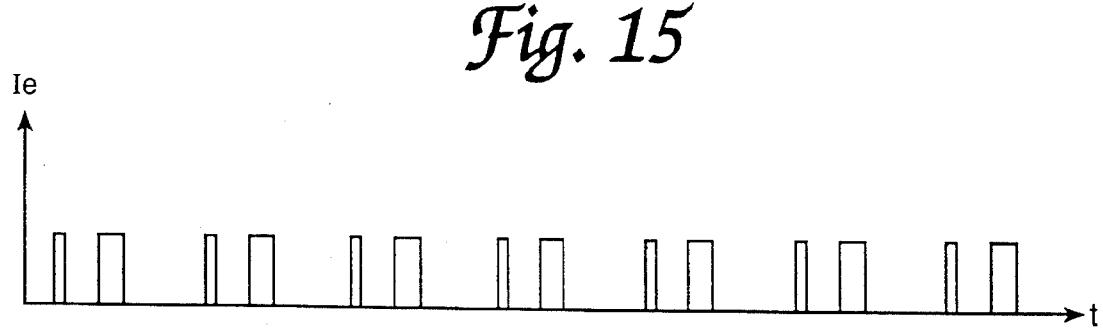
FIG. 15 is a diagram showing currents of an emitter of a transistor in the first embodiment.

Supposing that Vbe has a characteristic shown in FIG. 14 (solid line) and that the breaking range of transistor TR is the level of the broken line in FIG. 14, emitter current Ie is generated only when Vbe exceeds the broken line as shown in FIG. 15.

Induced electromotive force below is generated in each closed circuit 102' by emitter current Ie.

$$Eo = -\frac{M}{\Gamma^2} \cdot \frac{dIe}{dt} \quad (12)$$

Figure 16:
FIG. 16 is a diagram showing induced electromotive force of a closed circuit for output in the first embodiment.

FIG. 16 is a diagram showing induced electromotive force Eo by generated emitter current in FIG. 15.

Figure 17:
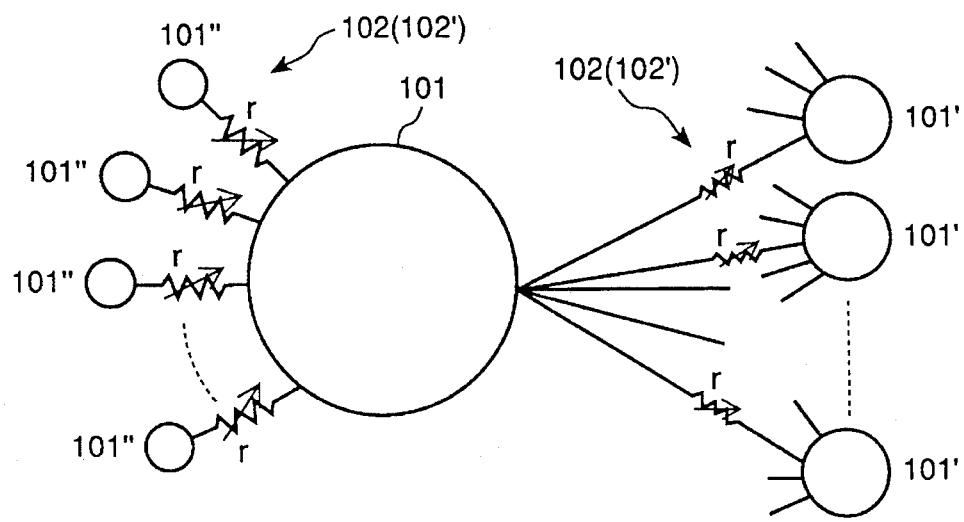
FIG. 17 is a diagram showing a connection of normalizing circuits.

As described above, normalized circuit 101 can execute threshold processing based on switching characteristics. As shown in FIG. 17, any outputs of normalizing circuit 101 can be input to other normalizing circuits 101' by closed circuit 102 (102') and simultaneously, the outputs of other normalizing circuits 101" can be input to a normalizing circuit 101 by closed circuit 102 (102'). Therefore, a network can be generated, and it is possible to set a synapse weight by adjusting variable resister r in closed circuit 102 (102').

Figure 18:
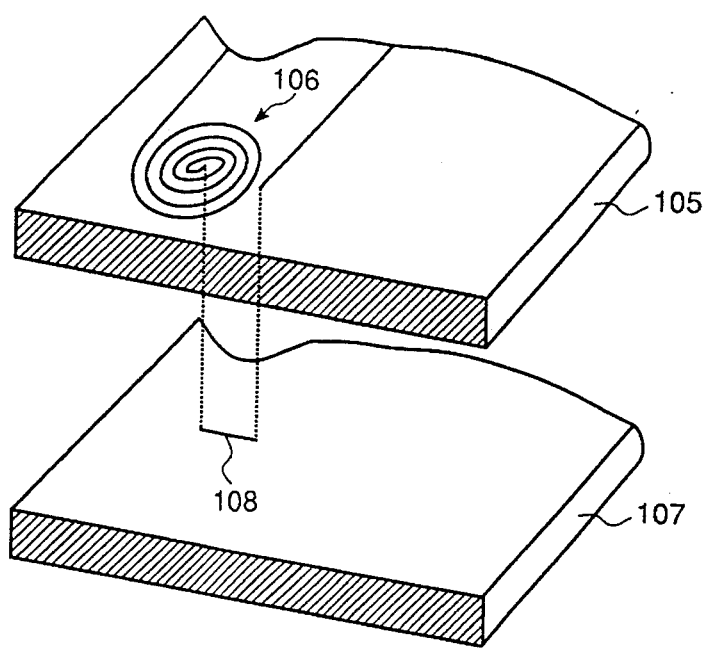
FIG. 18 is a perspective view of a first inductance structure in an integrated circuit (IC)
Figure 19:
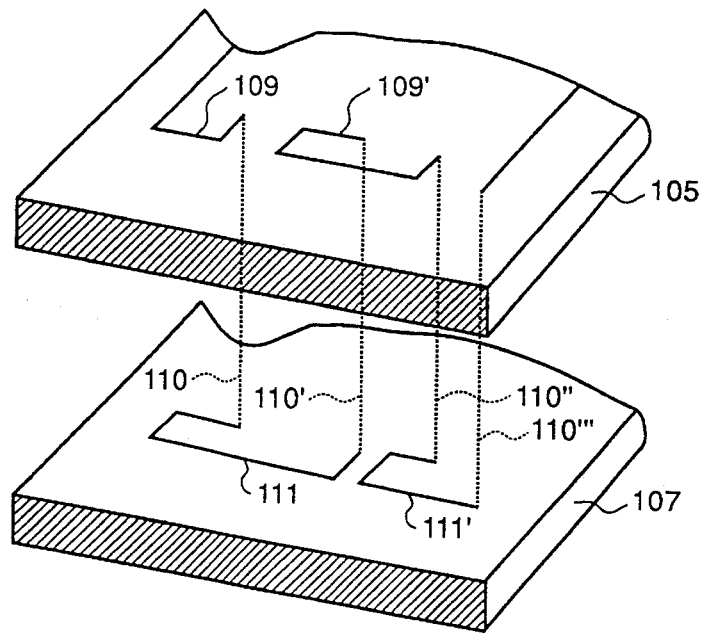
FIG. 19 is a perspective view of a second inductance structure in an IC.

When inductances are constructed in an integrated circuit (IC) for normalizing circuit 101 and closed circuits 102 and 102', a construction in FIG. 18 or FIG. 19 can be applied.

In FIG. 18, conductor 108 is formed, which performs as:

i) Forming spiral conductor 106 on the first insulator 105, and ii) Penetrating the first insulator 105 from the center of conductor 106, through insulator 105, past the second insulator 107 and back again onto the first insulator 105.

Current can be generated in conductor 106 and inductance can be realized by such a structure.

In FIG. 19, conductor 110 and hooked conductor 111 are formed. Conductor 110 performs as:

i) Forming hooked conductor 109 on the first insulator 105, ii) Penetrating the first insulator 105 from an end of conductor 109, through insulator 105 to reach the second insulator 107.

Figure 20:
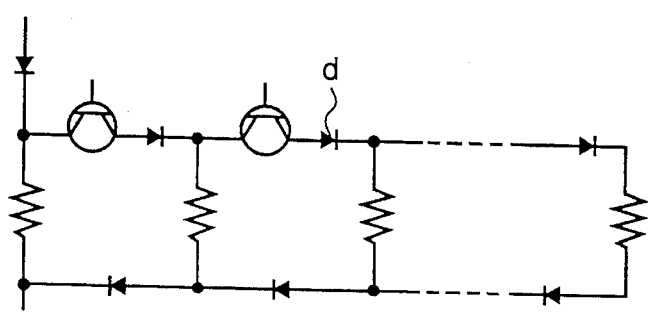
FIG. 20 shows a circuit of a form of changeable resistance in an IC.

Hooked conductor 111 is connected to conductor 110. A circular circuit is constructed by hooked conductors 109 and 111 in such a structure, and inductance can be realized. It is possible to realize laterally expanded inductance by connecting conductors in the order of 109, 111, 109', 111', . . . on generating a plurality of hooked conductors (109, 109') on insulator 105 and generating a plurality of hooked conductors (111, 111', . . . ) on insulator 107. Variable resistance r can be realized by the structure in FIG. 20 which is connected in parallel through diode d and transistor.

Advantages of the Present Invention

As mentioned above, the data processing system according to the present invention has advantages;

i) advantages of efficiency, as well as faculty to achieve expected objective results, since the number of neural layers is equal to the number corresponding to the abstraction difference between output data and input data, the structure of at least two neural layers are divided into a plurality of neural cells, each of which includes at least one neuron, and a neuron included in each neural cell is not connected to the neuron of other neural cells; therefore, a predetermined processing is certainly performed because heterogeneous data are never processed in one neural cell but processed in parallel and independently from one another.

Furthermore, a data processing system according to the present invention drives the input resonance system connected to a switching circuit by which the output resonance system is driven. It is possible to fabricate the number of neurons for a network, since it is possible to realize the network with the function of normalization by analog circuitry.

What is claimed is:

1. A data processing system comprising:

a normalizing element having an input inductor coupled to receive an input signal, a switching circuit responsive to the input signal to generate a switched signal, and a switched inductor energized in response to the switched signal;

a plurality of driving elements, each having an output inductor magnetically coupled to the input inductor of the normalizing element; and a plurality of driven elements, each having a driven inductor magnetically coupled to the switched inductor of the normalizing element;

wherein the normalizing element receives an aggregation of signals from the plurality of driving elements as the input signal to the input inductor.

2. A system according to claim 1, wherein the switched inductor is constructed with a spiral conductive pattern formed on a first side of an insulating body, one end of said spiral being lead through said first side to a second side of the insulating body.

3. A system according to claim 1, wherein the switched inductor is constructed with a first hooked conductive pattern formed on a first side of an insulating body, and a second hooked conductive pattern formed on a second side of the insulating body, the first and second patterns being in parallel planes, the first and second patterns connected by a conductor extending from the first pattern to the second pattern.

4. A system according to claim 1 wherein the normalizing element has an overall switching characteristic which results in energization of the switched inductor when the input signal exceeds a threshold, thereby inducing a signal in each of the driven elements.

5. A system according to claim 1 wherein at least one of the driving elements further includes an attenuation circuit attenuating the energization of the output inductor of that at least one driving element, thereby attenuating the contribution of that at least one driving element to the input signal of the normalizing element.

\* \* \* \* \*